(12) United States Patent
Bond (10) Patent No.: US 7,195,212 B2
(45) Date of Patent: Mar. 27, 2007

(54) MOUNTING APPARATUS FOR PARAMETER MEASURING DEVICE

(76) Inventor: Richard E. Bond, 315 Magee Ave., Mill Valley, CA (US) 94941

( * ) Notice: Subject to any disclaimer, the term of this patent is extended or adjusted under 35 U.S.C. 154(b) by 0 days.

(21) Appl. No.: 10/359,415

(22) Filed: Feb. 5, 2003

(65) Prior Publication Data
US 2004/0149865 A1    Aug. 5, 2004

(51) Int. Cl.
*B62J 11/00* (2006.01)
(52) U.S. Cl. ................. 248/115; 248/442; 224/412
(58) Field of Classification Search ........... 248/442, 248/200, 300, 309.2, 114, 115, 205.5, 206.1; 224/164, 412, 419, 441; 33/501
See application file for complete search history.

(56) References Cited
U.S. PATENT DOCUMENTS

| | | | | |
|---|---|---|---|---|
| 1,136,520 A | * | 4/1915 | Fukami | ............ 368/316 |
| 1,359,402 A | * | 8/1920 | Wiggers | ............ 248/442 |
| 1,566,890 A | * | 12/1925 | Lux | ............ 248/442 |
| 1,678,990 A | * | 7/1928 | Mansfield | ............ 248/115 |
| 1,835,871 A | | 12/1931 | Hickman | |
| 2,061,855 A | | 12/1936 | Spencer | |
| 2,347,113 A | | 4/1944 | King | |
| 2,527,940 A | * | 10/1950 | Krueger | ............ 362/23 |
| 2,563,749 A | * | 8/1951 | Rose et al. | ............ 24/3.5 |
| 2,673,056 A | | 3/1954 | Manetti | |
| 2,701,964 A | * | 2/1955 | Argabrite | ............ 374/206 |
| 2,884,215 A | | 4/1959 | Weidner | |
| 2,924,364 A | * | 2/1960 | Raguse | ............ 224/197 |
| 3,319,914 A | | 5/1967 | Chiappetta | |
| 3,643,088 A | | 2/1972 | Osteen et al. | |
| 3,653,624 A | | 4/1972 | Abel | |
| 3,658,345 A | * | 4/1972 | Siggson | ............ 473/214 |
| 3,858,836 A | | 1/1975 | Marcyan | |
| 4,157,166 A | | 6/1979 | Voelker | |
| 4,473,873 A | | 9/1984 | Quiogue | |
| 4,712,396 A | * | 12/1987 | Cary et al. | ............ 70/129 |
| 4,746,225 A | * | 5/1988 | Ashe | ............ 374/208 |
| 5,087,005 A | * | 2/1992 | Holoff et al. | ............ 248/205.8 |
| 5,664,718 A | | 9/1997 | Vine | |
| 5,681,019 A | | 10/1997 | Boyce | |
| 5,704,132 A | | 1/1998 | Bourne | |
| 5,785,222 A | | 7/1998 | Basso et al. | |
| 6,073,899 A | | 6/2000 | Omrani | |
| 6,252,159 B1 | * | 6/2001 | Anagnos | ............ 174/35 MS |

* cited by examiner

*Primary Examiner*—Carl D. Friedman
*Assistant Examiner*—Steven M. Marsh
(74) *Attorney, Agent, or Firm*—Lewis Brisbois; Bisgaard & Smith LLP

(57) ABSTRACT

A mounting apparatus for use with a parameter measuring device includes a stem extending from an outer casing of the parameter measuring device, where the stem includes an internally threaded opening. A mounting plate having an integral barrel formed thereon cooperates with the measuring device wherein the mounting plate abuts the outer casing and the integral barrel surrounds the stem. A mounting bar is secured to a distal end of the integral barrel wherein the mounting bar serves to attach the measuring device to an external surface. Finally, a threaded fastener is threadedly received within the internally threaded opening of the stem for securing the mounting bar and the mounting plate to the measuring device.

18 Claims, 5 Drawing Sheets

MOUNTING APPARATUS FOR PARAMETER MEASURING DEVICE

BACKGROUND OF THE INVENTION

1. Technical Field

The present invention relates to a mounting apparatus. More specifically, the present invention relates to methods and structure for a mounting apparatus for use in securing a parameter measuring device such as a clock, thermometer, compass or other meter or gauge to a motorcycle, scooter, bicycle, water craft or other vehicle.

2. Background Art

The prior art is directed to methods and structure for the mounting of clocks, meters and gauges on vehicles.

During the operation of vehicles, including those intended for use by a single rider such as motorcycles, scooters, bicycles, watercraft including jet skis, and the like, vehicle mounted clocks, meters and gauges are useful. Many different methods and structural combinations have been known in the prior art for mounting such clocks, meters and gauges onto a vehicle. Examples of some of the methods and structural combinations include the following.

U.S. Pat. No. 1,835,871 discloses an auto dashboard attachment for supporting auxiliary instruments from the instrument panel of a motor vehicle. U.S. Pat. No. 2,061,855 discloses a support for bathroom articles utilizing a conventional wall bracket and threaded fasteners. U.S. Pat. No. 2,347,113 teaches an electric lighting fixture which employs a U-bracket arrangement. U.S. Pat. No. 2,673,056 discloses a dispensing device and mounting plate utilizing parallel supports for supporting a tissue dispenser. U.S. Pat. No. 2,884,215 teaches a mounting device for supporting electrical meters on top of machinery. U.S. Pat. No. 3,319,914 discloses a movable table attachment for a machine tool which is adjustable along a horizontal arm. U.S. Pat. No. 3,643,088 teaches a luminaire support designed to enable the optical assembly to be mounted in offset relation to an associated ballast housing using a horizontally adjustable bracket. U.S. Pat. No. 3,653,624 discloses a support device designed to be suspended from the edge of a hospital bed for containing bodily fluids in receptacles for subsequent collection by lab personnel.

U.S. Pat. No. 3,858,836 teaches a universally adjustable cantilever bracket for general utility comprised of a plurality of serially connected friction joints which can assume a multitude of positions for use in industrial applications. U.S. Pat. No. 4,157,166 discloses a leather holder for eyeglasses having a hole for encircling a rearview mirror and two lower holes for insertion of the temple piece of an eyeglass frame. U.S. Pat. No. 4,473,873 teaches a leveling luminaire hanger which includes a link having an opening to hang on a hook and a connector coupled to the lower end of the link for supporting an offset load. U.S. Pat. No. 5,664,718 teaches a beverage container receptacle which utilizes a U-shaped bracket fastened to a circular ring for supporting a beverage container above its center of gravity. U.S. Pat. No. 5,681,019 discloses a flexible bottle holder for livestock having a main body support configured for supporting a livestock feeding bottle thereon and a gripping member for grasping a wall support edge. U.S. Pat. No. 5,704,132 teaches an indicator holder with slidable connecting member for use in connection with a dial test indicator and with machine tools such as a jigbore or milling machine. U.S. Pat. No. 5,785,222 discloses an article holder for mounting in a vehicle comprising a panel member carrying pockets and two hangers for supporting the panel on vehicle structure edges of two different thicknesses. Finally, U.S. Pat. No. 6,073,899 teaches a Z-shaped universal tissue box hanger employed for suspending a parallelepiped, such as a box for storing and dispensing tissue papers, from furniture having a graspable element.

Notwithstanding the copious prior art relating to mounting brackets and devices, a mounting apparatus for use in securing a parameter measuring device to a vehicle was not discovered. Many of the mounting brackets and devices of the past are not suitable for use in removably attaching a measuring device such as a clock, thermometer or compass to a single person vehicle such as a motorcycle, scooter, bicycle, moped, jet ski water craft or other equivalent personal vehicle. Thus, persons who drive any of these types of vehicles must necessarily rely on another source to determine, for example, the time or ambient temperature. This reliance on another source for example, a wristwatch, to determine the time, raises safety issues since the rider must necessarily let go of the handle bars with at least one hand to view the wristwatch.

Thus, there is a need in the art for a mounting apparatus for use with a parameter measuring device such as, for example, a clock, thermometer or compass which includes an integral stem extending from the housing of the parameter measuring device, where the integral stem includes an internally threaded opening, a pan-shaped mounting plate having an integral barrel or sleeve that slides over and surrounds the integral stem, and an angular mounting bar having a first penetration for receiving a first fastener threadedly secured in the internally threaded opening of the integral stem, and a second penetration for accommodating a second fastener for securing the entire mounting apparatus including the parameter measuring device to a personal vehicle.

DISCLOSURE OF THE INVENTION

Briefly, and in general terms, the present invention provides a new and improved mounting apparatus for use with a parameter measuring device such as, for example, a clock, thermometer, compass or the like. In particular, the mounting apparatus serves to secure the parameter measuring device to a suitable external surface typically associated with a vehicle, for example, a motorcycle, bicycle, moped, scooter, golf cart, watercraft, or the like. Once the mounting apparatus is installed, the measuring device is securely attached in position and provides reference information to an operator of the vehicle. However, the mounting apparatus is also removable by disconnecting a single threaded fastener.

In a preferred embodiment, the parameter measuring device associated with the mounting apparatus is a miniature clock having a clock mechanism enclosed within an outer stainless steel clock casing. The clock casing is circular in shape and includes a rear side. The clock also comprises a conventional clock face having suitable numerals printed thereon, a set of hour, minute and second hands driven by the clock mechanism, and a setting pin. The clock face is viewed through a glass cover that is securely mounted within the circular clock casing to provide waterproofing. The clock casing further includes a stainless steel circular stem formed integral with and projecting from the rear side of the clock casing wherein the stem includes an internally threaded opening.

The mounting apparatus further includes a mounting plate having a circular shape wherein the outer circumference of the mounting plate extends upward forming a continuous lip. The mounting plate includes a cylindrical integral barrel formed thereon, each cooperating with the measuring device such that the mounting plate abuts the rear side of the outer casing and the integral barrel surrounds the stem extending from the outer casing of the miniature clock. An angular mounting bar is secured to a distal end of the integral barrel formed on the mounting plate by a threaded fastener.

The mounting bar serves to secure the measuring device, i.e., the miniature clock, to a suitable external surface of a vehicle such as a windscreen of a motorcycle, or to a bracket provided for mounting gauges and meters, or to any convenient bolt or screw existing on the motorcycle, or to a switch housing. In the case of attachment of the measuring device to a windscreen, the mounting can be accomplished with a removable securing fastener. The mounting bar includes an obtuse angle for advantageously positioning the miniature clock. Further, the mounting bar includes a pair of penetrations formed there through, one of the penetrations being aligned with the terminal end of the integral barrel. The threaded fastener is a socket head screw that is directed through the aligned penetration of the mounting bar and into the distal end of the cylindrical integral barrel, and is subsequently threadedly received within the internally threaded opening of the stem. This construction secures the mounting bar and the mounting plate to the miniature clock. When assembled, each of the components of the mounting apparatus is held together by the socket head screw.

The present invention is generally directed to a mounting apparatus for use in removably securing a parameter measuring device such as a miniature clock, thermometer or compass to a suitable external surface typically associated with a vehicle such as a motorcycle. The mounting apparatus enables one of a plurality of different measuring devices to be conveniently mounted on the vehicle for providing useful reference information to the operator of the vehicle. In its most fundamental embodiment, the mounting apparatus for use with the parameter measuring device includes a stem extending from an outer casing of the parameter measuring device, where the stem includes an internally threaded opening. A mounting plate having an integral barrel formed thereon cooperates with the measuring device wherein the mounting plate abuts the outer casing and the integral barrel surrounds the stem. A mounting bar is secured to a distal end of the integral barrel wherein the mounting bar serves to attach the measuring device to an external surface. Finally, a threaded fastener is threadedly received within the internally threaded opening of the stem for securing the mounting bar and the mounting plate to the measuring device.

These and other objects and advantages of the present invention will become apparent from the following more detailed description, taken in conjunction with the accompanying drawings which illustrate the invention, by way of example.

DETAILED DESCRIPTION OF THE INVENTION

Figure 12:
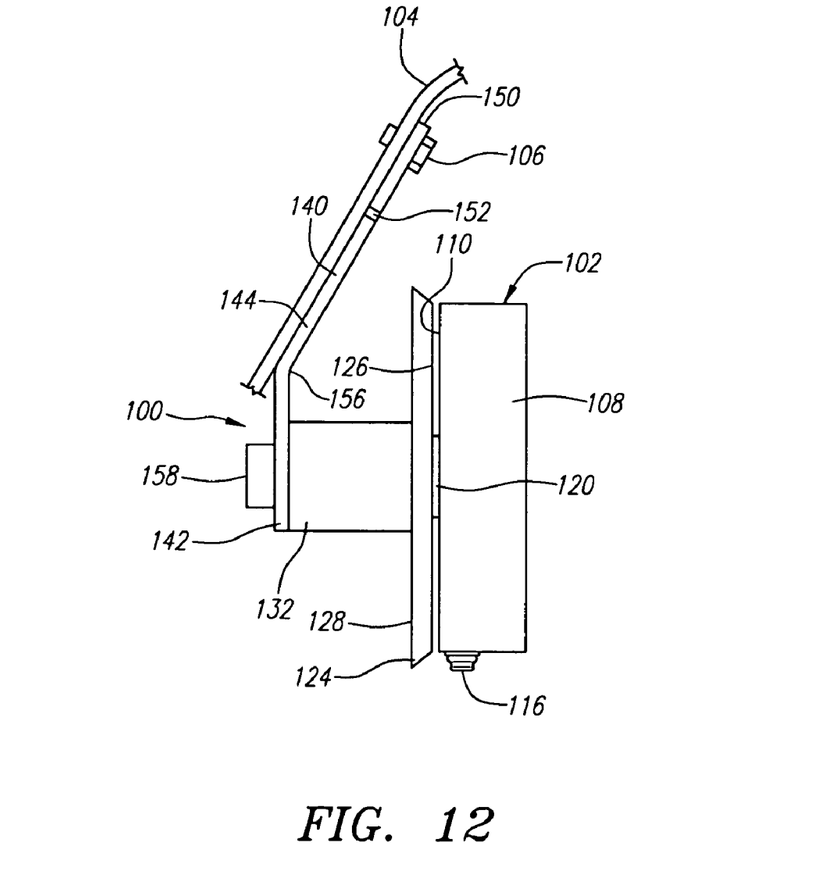
FIG. 12 is the left side elevation of the mounting apparatus of FIG. 1 showing the mounting bar securing the clock casing of the measuring device to an external surface by a fastener.
Figure 13:
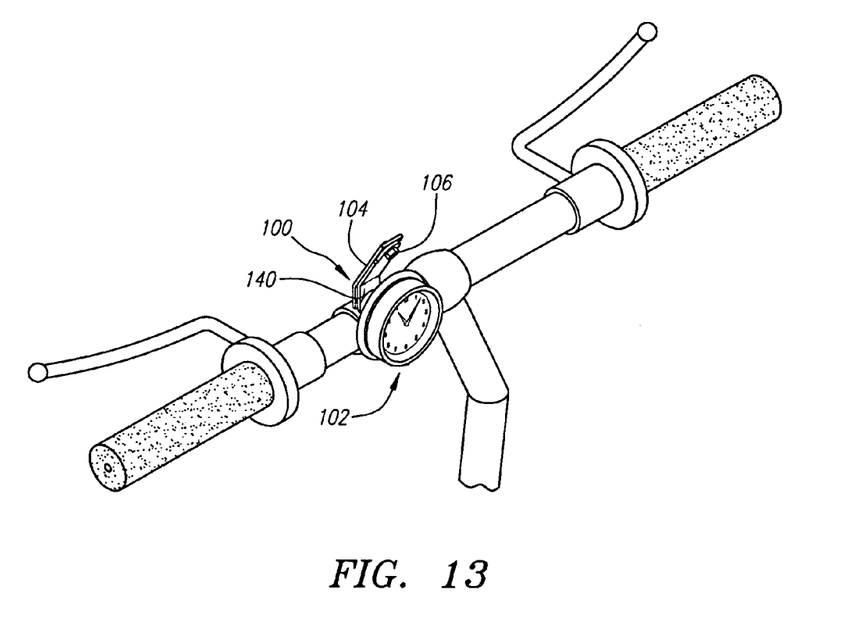
FIG. 13 is a perspective view of the mounting apparatus of FIG. 1 shown secured to a vehicle and simultaneously affixed to a parameter measuring device for providing parameter measuring data.

The present invention is a mounting apparatus 100 for use with a parameter measuring device 102 such as, for example, a clock, thermometer, compass or other meter or gauge device as shown in the accompanying FIGS. 1–12. In particular, the mounting apparatus 100 serves to secure the parameter measuring device 102 to a suitable external surface 104 typically associated with a vehicle, for example, a motorcycle, bicycle, moped, scooter, golf cart, water craft, or the like. Once the mounting apparatus 100 is installed, the measuring device 102 is securely attached in position. However, the mounting apparatus 100 is also removable by disconnecting a single securing fastener 106 as shown in FIG. 12. This removal feature allows for convenient interchangeability between a plurality of different measuring devices 102, i.e., remove one and replace with another. The mounting apparatus 100 enables any of a plurality of different measuring devices 102 to be conveniently mounted on the vehicle for providing useful reference information such as, for example, time, temperature or direction, to the operator of the vehicle.

Figure 1:
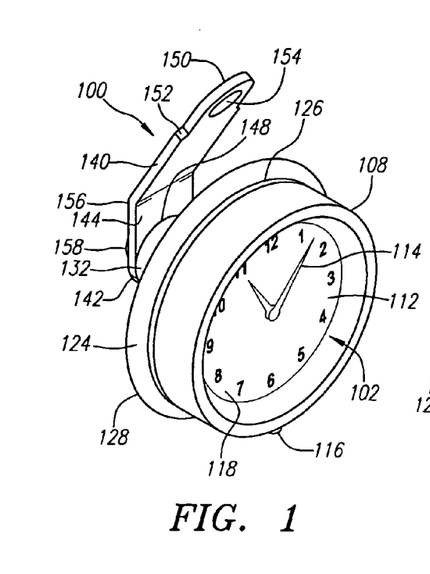
FIG. 1 is a perspective view of a mounting apparatus for a parameter measuring device showing a clock mechanism sealed within a casing, and a mounting plate having an integral barrel formed thereon and a mounting bar, each positioned behind the clock casing.
Figure 2:
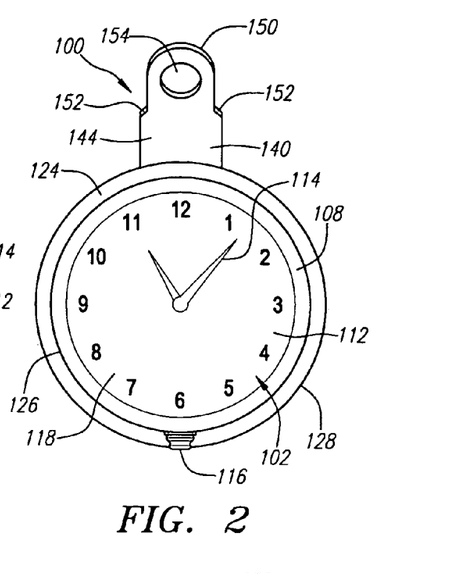
FIG. 2 is a front elevation of the mounting apparatus of FIG. 1 showing a face of the clock mechanism behind a glass cover, and a setting pin extending downward from the clock casing, with the mounting plate and mounting bar visible behind the clock casing.

A preferred embodiment of the mounting apparatus 100 is shown in FIGS. 1–12 and will now be described. The parameter measuring device 102 associated with the mounting apparatus 100 is a miniature clock having a clock mechanism (not shown) enclosed within an outer stainless steel clock casing 108 as shown in FIG. 1. The clock casing 108 is circular in shape, includes a rear side 110 best shown in FIGS. 8 and 9, and typically is comprised of stainless steel. The miniature clock 102 also comprises a conventional clock face 112 having conventional numerals printed thereon, a conventional set of hour, minute and second hands 114 driven by the clock mechanism (not shown), and a setting pin 116. The clock face 112 is viewed through a glass cover 118 that is securely mounted within the circular clock casing 108 to provide waterproofing. Thus, the sealed construction of the clock casing 108, the rear side 110 and the glass cover 118 provide an environment that protects the clock mechanism (not shown) from damage caused by moisture and dust. The set of hour, minute and second hands 114 can be adjusted in the conventional manner with the setting pin 116. Although the miniature clock 102 has been selected for illustration in the preferred embodiment, the mounting apparatus 100 can be utilized for securing a thermometer, compass or other meter or gauge to the external surface 104 shown in FIG. 12.

Figure 8:
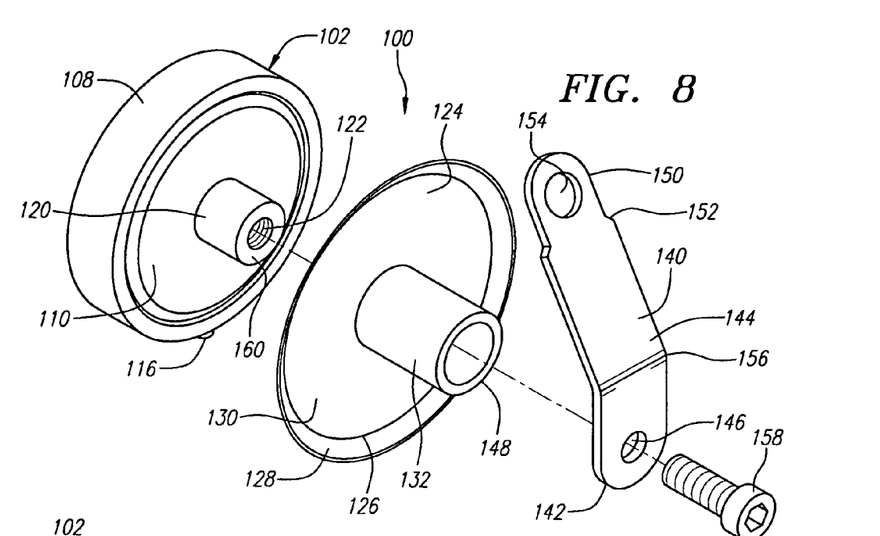
FIG. 8 is an exploded view of the mounting apparatus of FIG. 3 showing the clock casing having a cylindrical stem extending therefrom, the cylindrical stem having a plurality of internal threads, and the mounting plate including the integral barrel, the mounting bar and the socket head screw, all components shown in line.
Figure 9:
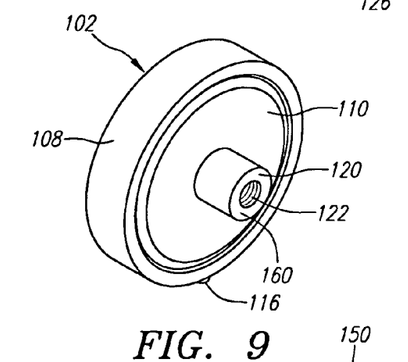
FIG. 9 is a rear perspective view of the clock casing of the mounting apparatus of FIG. 1 showing the setting pin extending downward from the clock casing, and the cylindrical stem extending from the rear side of the clock casing.

The clock casing 108 further includes a circular stem 120 formed integral with and projecting from the rear side 110 of the clock casing 108 wherein the stem 120 includes an internally threaded opening 122 as shown in FIGS. 8 and 9. Since the circular stem 120 is formed integral with the rear side 110 of the clock casing 108, the stem 120 is also comprised of stainless steel. Although the clock casing 108 is a component of the parameter measuring device, i.e., miniature clock 102, it is noted that the circular stem 120 and internally threaded opening 122 form an integral part of the mounting apparatus 100. In particular, the circular stem 120 and the internally threaded opening 122 must be present in the combination of structure to enable the mounting apparatus 100 to function properly.

Figure 3:
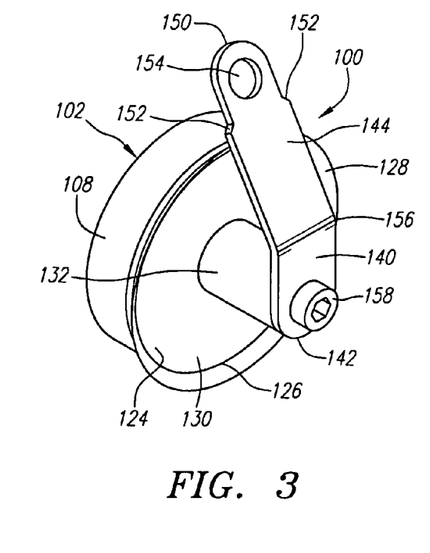
FIG. 3 is a rear perspective view of the mounting apparatus of FIG. 1 showing the mounting plate positioned behind the clock casing including the integral barrel extending from the mounting plate, and a socket head screw for securing the mounting bar to a terminal end of the integral barrel.
Figure 4:
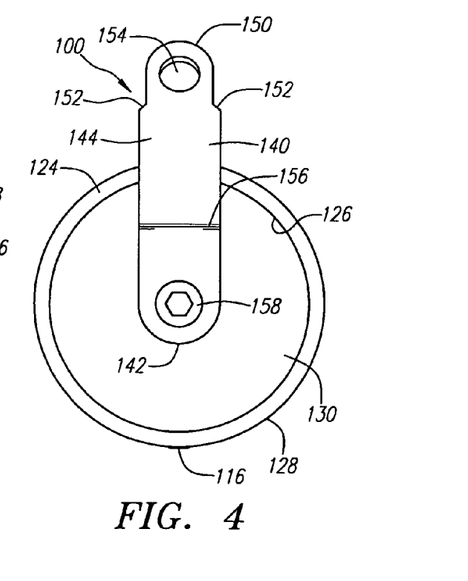
FIG. 4 is a rear elevation of the mounting apparatus of FIG. 1 showing the socket head screw securing the mounting bar to the backside of the mounting plate.
Figure 5:
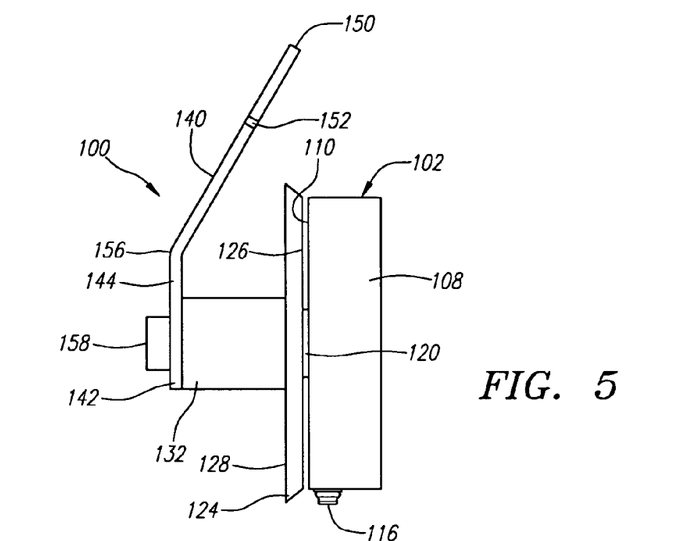
FIG. 5 is a left side elevation of the mounting apparatus of FIG. 1 showing the clock casing with the setting pin extending downward therefrom, and with the mounting plate and integral barrel, mounting bar and socket head screw positioned there behind.
Figure 6:
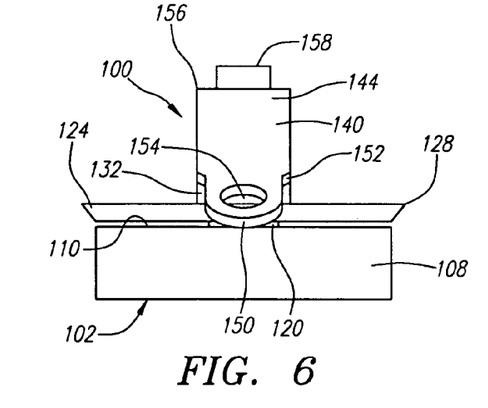
FIG. 6 is a top plan view of the mounting apparatus of FIG. 1 showing the clock casing, the mounting plate including the integral barrel, mounting bar and socket head screw.
Figure 7:
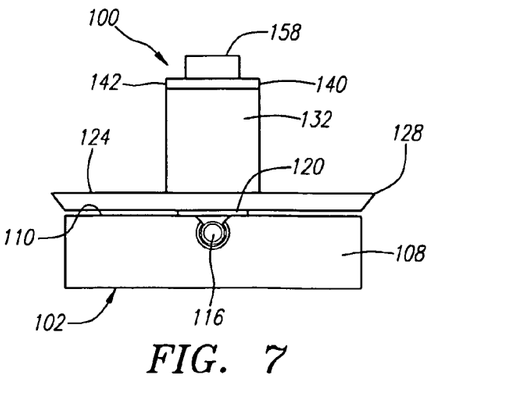
FIG. 7 is a bottom plan view of the mounting apparatus of FIG. 1 showing the clock casing including the setting pin extending therefrom, the mounting plate and the integral barrel, and the socket head screw securing the mounting bar to integral barrel.
Figure 10:
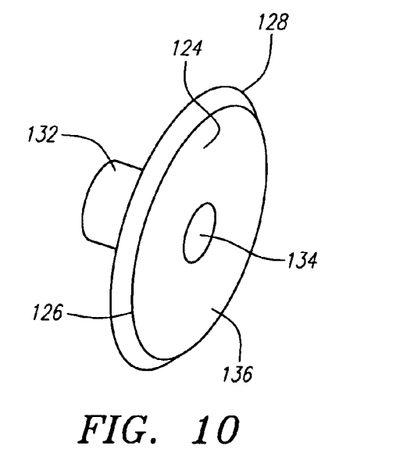
FIG. 10 is a rear perspective view of the mounting plate of the mounting apparatus of FIG. 1 showing the flat side of the mounting plate and a portion of the integral barrel.
Figure 11:
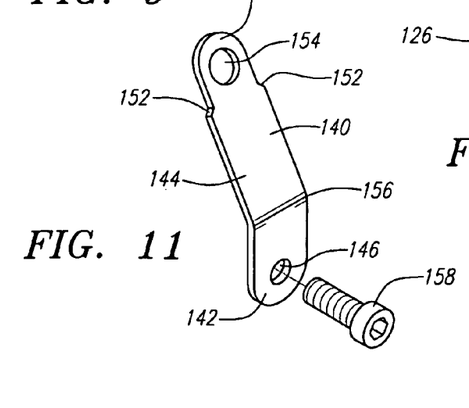
FIG. 11 is a perspective view of the mounting bar of the mounting apparatus of FIG. 1 showing an obtuse angle and a pair of penetrations formed in the mounting bar, and a plurality of external threads formed on the socket head screw.

The mounting apparatus 100 further includes a mounting plate 124 which is an optional component but is being included in the description of the preferred embodiment herein. The mounting plate 124 is generally circular in shape wherein an outer circumference 126 of the mounting plate 124 extends upward forming a continuous lip 128 as is shown in FIGS. 3, 8 and 10. The presence of the continuous lip 128 causes the mounting plate 124 to assume a pan-like appearance on its back side 130 as is best shown in FIG. 8. An integral barrel 132 is integrally formed on and extends outwardly from the back side 130 of the mounting plate 124. The integral barrel 132 is hollow. At the point where the integral barrel 132 interfaces with the back side 130, a penetration 134 is formed in a base section 136 of the mounting plate 124 as is best shown in FIG. 10. When the continuous lip 128 of the mounting plate 124 is viewed from the base section 136, it is referred to as a "beauty ring". The mounting plate 124 and the cylindrical integral barrel 132 each cooperate with the parameter measuring device, i.e., the miniature clock 102. This cooperation is realized in that (a) the integral barrel 132 slides over and surrounds the stainless steel circular stem 120 that extends from the clock casing 108, and (b) the base section 136 of the mounting plate 124 (see FIG. 10) abuts the rear side 110 of the outer clock casing 108 of the miniature clock 102 as is shown in FIG. 5. In effect, the mounting plate 124 serves as a platform for each of the plurality of parameter measuring devices, i.e., miniature clock 102 or a thermometer or a compass. It is noted that the mounting plate 124 and integral barrel 132 are fashioned from stainless steel. This design in which the circular stem 120 fits into the integral barrel 132 is referred to as "stem-in-barrel" technology.

The mounting apparatus 100 further includes a mounting bar 140 for attaching the parameter measuring device, i.e., miniature clock 102, to the external surface 104 as is best shown in FIG. 12. The mounting bar 140 is also comprised of stainless steel and is angular in design. A first terminal end 142 of the mounting bar 140 has a dimension that is uniform with the dimension of the body 144 of the mounting bar 140. The first terminal end 142 is rounded and includes a first (smaller) penetration 146 utilized for aligning with a distal end 148 of the integral barrel 132 and the internally threaded opening 122 of the circular stem 120. A second terminal end 150 of the mounting bar 140 is reduced in dimension when compared to the dimension of the body 144. The body 144 adjacent to the second terminal end 150 includes a pair of notches 152 clearly shown in FIGS. 2, 3, 8 and 11. The second terminal end 150 is also rounded and includes a second (larger) penetration 154 utilized for receiving the securing fastener 106 for anchoring the miniature clock 102 to the external surface 104 (see FIG. 12). The pair of notches 152 formed at the interface between the body 144 and the second terminal end 150 serve to accommodate the attachment of the miniature clock 102 to the external surface 104 where the external surface 104 includes a recess or key way. The recess or key way might be associated with a housing assembly or bracket mounted on the handlebars of a motorcycle or bicycle.

The mounting bar 140 is shaped to include an obtuse angle 156 which is approximately 30 degrees from the vertical as is clearly shown in FIGS. 1, 3, 5, 8 and 11. This obtuse angle 156 is useful in positioning the parameter measuring device, i.e., the miniature clock 102, once it is mounted on and secured to the external surface 104 which can be, for example, the windscreen of a motorcycle. During mounting of the miniature clock 102, the mounting bar 140 is typically positioned at 12:00 o'clock high, i.e., vertical in position directly behind the "12" as it appears on the clock face 112 as shown on FIG. 2. When the first penetration 146 is aligned with the distal end 148 of the integral barrel 132 and with the internally threaded opening 122, a threaded fastener 158 can be inserted through the first penetration 146 and integral barrel 132, and into the internally threaded opening 122 as shown in FIG. 8. The threaded fastener 158 can be a socket head screw which when threadedly inserted will secure the mounting bar 140 and the mounting plate 124 to the circular stem 120 integral with the rear side 110 of the clock casing 108. Thus, the obtuse angle 156, first penetration 146, and second penetration 154 each formed in the mounting bar 140 function to accommodate the attachment of the mounting bar 140 to the distal end 148 of the integral barrel 132 and to the external surface 104. Since the mounting bar 140 is connected to the parameter measuring device, the miniature clock 102 is held securely in place. By loosening the threaded fastener 158, the mounting apparatus 100 can be adjusted or rotated to any advantageous position. As with the other components of the present invention, the mounting bar 140 is comprised of stainless steel.

In the preferred embodiment, the mounting bar 140 serves to secure the measuring device, i.e., the miniature clock 102, to a suitable external surface 104 of a vehicle such as a windscreen of a motorcycle as illustrated in FIG. 12. However, the mounting bar 140 of the measuring device, i.e., miniature clock 102, can also be secured to a bracket (not shown) provided for mounting gauges and meters, or to any convenient bolt or screw existing on the motorcycle, or to a switch housing. The point is that the mounting bar 140 can be conveniently secured to any suitable location available on the vehicle. Furthermore, the structural elements including the circular stem 120, mounting plate 124, and mounting bar 140 can be comprised of materials other than stainless steel, for example, aluminum, high strength plastic, or other suitable metallic and non-metallic materials.

In a situation in which the mounting plate 124 is not utilized, the first (smaller) penetration 146 is aligned directly with a distal end 160 of the circular stem 120 extending from the rear side 110 of the clock casing 108 as shown in FIG. 8. Under these conditions, the threaded fastener 158 (i.e., socket head screw) would be threaded directly into the internally threaded opening 122. The miniature clock 102 would then be secured to the external surface 104 by the securing fastener 106 as shown in FIG. 12. When the mounting plate 124 is fitted onto the circular stem 120, the integral barrel 132 extends out farther than the circular stem 120 extends (i.e., when the mounting plate 124 is not utilized). Thus, the distance provided for clearance in the two circumstances differ depending upon the type of bracket or external surface 104 utilized. Yet, in another situation where the mounting apparatus 100 is to be mounted upon the handle bars (not shown) of a motorcycle or bicycle, a loom clamp or pipe clamp (not shown) can be used in conjunction with a rubber sleeve (not shown) to position the miniature clock 102.

In summary, the most fundamental embodiment of the mounting apparatus 100 for use with a parameter measuring device 102 comprises a stem 120 extending from an outer casing 108 of the parameter measuring device 102, where the stem 120 includes an internally threaded opening 122. A mounting plate 124 having an integral barrel 132 formed thereon cooperates with the measuring device 102 wherein the mounting plate 124 abuts the outer casing 108 and the integral barrel 132 surrounds the stem 120. A mounting bar 140 is secured to a distal end 148 of the integral barrel 132 wherein the mounting bar 140 serves to attach the measuring device 102 to an external surface 104. Finally, a threaded fastener 158 is threadedly received within the internally threaded opening 122 of the stem 120 for securing the mounting bar 140 and the mounting plate 124 to the measuring device 102.

The present invention provides novel advantages over other mounting devices known in the prior art. A main advantage of the mounting apparatus 100 is that it can accommodate a plurality of different parameter measuring devices 102 including a clock, thermometer or compass, each of which includes an integral stem 120 extending from an outer casing 108 for interfacing with a mounting plate 124 and a mounting bar 140. Further, the mounting bar 140 can be easily adjusted to accommodate the positioning of the parameter measuring device 102. Finally, the parameter measuring device 102 can be mounted to any desired surface including the windscreen of a motorcycle, boat, golf cart, or the like.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

It is therefore intended by the appended claims to cover any and all such modifications, applications and embodiments within the scope of the present invention.

What is claimed is:

1. A mounting apparatus in combination with a parameter measuring device secured to a vehicle comprising:
    a parameter measuring device having an outer casing;
    a stem extending from said outer casing of said parameter measuring device, said stem having an internally threaded opening;
    a mounting plate having an integral barrel formed on and extending outwardly from a back side of said mounting plate, said mounting plate cooperating with said measuring device wherein said mounting plate abuts said outer casing and said integral barrel surrounds said stem;
    a mounting bar secured to a distal end of said integral barrel, said mounting bar for attaching said measuring device to an external surface of a vehicle; and
    a threaded fastener threadedly received within said internally threaded opening of said stem for securing said mounting bar and said mounting plate to said measuring device.

2. The mounting apparatus of claim 1 wherein said stem is cylindrical in shape.

3. The mounting apparatus of claim 1 wherein said mounting plate is circular in shape.

4. The mounting apparatus of claim 1 wherein said mounting plate is circular shaped and wherein the outer circumference of the mounting plate extends upward forming a lip.

5. The mounting apparatus of claim 1 wherein said integral barrel of the mounting plate is cylindrical in shape.

6. The mounting apparatus of claim 1 wherein said mounting bar includes an obtuse angle for positioning said measuring device once mounted on said external surface of said vehicle.

7. The mounting apparatus of claim 1 wherein said mounting bar further includes a pair of penetrations for accommodating attachment of said mounting bar to said integral barrel and said external surface of said vehicle.

8. The mounting apparatus of claim 1 wherein said threaded fastener is a socket head screw.

9. The mounting apparatus of claim 1 wherein said stem is comprised of stainless steel.

10. The mounting apparatus of claim 1 wherein said mounting plate is comprised of stainless steel.

11. The mounting apparatus of claim 1 wherein said mounting bar is comprised of stainless steel.

12. The mounting apparatus of claim 1 wherein said stem is comprised of aluminum.

13. The mounting apparatus of claim 1 wherein said mounting plate is comprised of aluminum.

14. The mounting apparatus of claim 1 wherein said mounting bar is comprised of aluminum.

15. The mounting apparatus of claim 1 wherein said stem is comprised of plastic.

16. The mounting apparatus of claim 1 wherein said mounting plate is comprised of plastic.

17. The mounting apparatus of claim 1 wherein said mounting bar is comprised of plastic.

18. A mounting apparatus in combination with a parameter measuring device secured to a vehicle comprising:
    a parameter measuring device having an outer casing;

a stem extending from said outer casing of said parameter measuring device, said stem having an internally threaded opening;

a mounting plate having an integral barrel formed on and extending outwardly from a back side of said mounting plate, said mounting plate cooperating with said measuring device wherein said mounting plate abuts said outer casing and said integral barrel surrounds said stem;

a mounting bar secured to a distal end of said integral barrel, said mounting bar for attaching said measuring device to an external surface of a vehicle;

a pair of notches formed in a terminal end of said mounting bar, said notches for accommodating the attachment of said measuring device to said external surface of said vehicle; and a threaded fastener threadedly received within said internally threaded opening of said stem for securing said mounting bar and said mounting plate to said measuring device.

* * * * *